(12) United States Patent
Höck et al.

(10) Patent No.: US 10,295,036 B2
(45) Date of Patent: May 21, 2019

(54) BALANCING UNIT OF A MOTOR VEHICLE AND METHOD FOR CONTROLLING SAME

(71) Applicant: GKN Driveline International, Lohmar (DE)

(72) Inventors: Michael Höck, Neunkirchen-Seelscheid (DE); Harwin Niessen, Hürth (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 288 days.

(21) Appl. No.: 15/102,319

(22) PCT Filed: Dec. 18, 2013

(86) PCT No.: PCT/EP2013/077248
§ 371 (c)(1),
(2) Date: Jun. 7, 2016

(87) PCT Pub. No.: WO2015/090392
PCT Pub. Date: Jun. 25, 2015

(65) Prior Publication Data
US 2017/0037949 A1   Feb. 9, 2017

(51) Int. Cl.
*F16H 48/19* (2012.01)
*F16H 48/22* (2006.01)
*B60K 23/04* (2006.01)

(52) U.S. Cl.
CPC ............ *F16H 48/19* (2013.01); *B60K 23/04* (2013.01); *F16H 48/22* (2013.01); *B60K 2023/043* (2013.01); *B60Y 2300/82* (2013.01); *B60Y 2400/804* (2013.01)

(58) Field of Classification Search
CPC .... F16H 48/19; F16H 48/22; B60K 2023/043
USPC .......................................................... 74/335
See application file for complete search history.

(56) References Cited

U.S. PATENT DOCUMENTS

| 8,845,473 | B2 * | 9/2014 | Nett ................... | F16H 57/0409 180/244 |
| 9,291,212 | B2 * | 3/2016 | Nett ................... | F16H 57/0471 |
| 9,718,355 | B2 * | 8/2017 | Osborn ................. | B60K 17/35 |
| 9,845,006 | B2 * | 12/2017 | Ogawa ................. | B60K 17/02 |

FOREIGN PATENT DOCUMENTS

| CN | 1911700 A | 2/2007 |
| DE | 4039391 A1 | 6/1991 |
| DE | 4021747 A1 | 1/1992 |

(Continued)

OTHER PUBLICATIONS

International Search Report for PCT/EP2013/077248 dated Sep. 16, 2014 (5 pages; with English translation).

(Continued)

*Primary Examiner* — Ha Dinh Ho
(74) *Attorney, Agent, or Firm* — Bejin Bieneman PLC

(57) ABSTRACT

To reduce the complexity and the outlay involved in the development and implementation in a vehicle of systems and methods known from the prior art for operating a differential-free, clutch-controlled balancing unit having a first clutch and a second clutch, the invention provides for the first clutch and the second clutch to be controlled independently of the driving conditions, and always using the same variable controlled variable of the same value.

18 Claims, 2 Drawing Sheets

(56)  References Cited

FOREIGN PATENT DOCUMENTS

| | | |
|---|---|---|
| DE | 102007030091 A1 | 10/2008 |
| EP | 2116411 A1 | 11/2009 |
| JP | H03182840 A | 8/1991 |
| JP | 03-279027 | 12/1991 |
| JP | 2010164080 A | 7/2010 |

OTHER PUBLICATIONS

Chinese Office Action for Application No. 201380081736X dated Nov. 3, 2017 (16 pages; with English translation).
Office Action dated May 25, 2017 by the JPO on application No. JP2016541364 (original with English translation; 8 pages).

* cited by examiner

BALANCING UNIT OF A MOTOR VEHICLE AND METHOD FOR CONTROLLING SAME

CROSS-REFERENCE TO RELATED APPLICATIONS

This application is a national stage of, and claims priority to, Patent Cooperation Treaty Application No. PCT/EP2013/077248, filed on Dec. 18, 2013, which application is hereby incorporated herein by reference in its entirety.

BACKGROUND

Balancing units for a motor vehicle and systems and methods for operating same are known, for example, from EP 2 116 411 A1 or DE 40 39 391 A1. In this context, in each case two separately actuable control valves are used in order to respectively actuate the first or second clutch in a selective fashion with a specific control pressure, in order to influence as a function of the driving state the clutch torque which can be transmitted to the assigned driven wheel by the respective clutch. These refinements make it possible, in particular, to apply different torques to the right-hand and left-hand driven wheels, and to set the desired power distribution or torque distribution to the two driven wheels of an axle in virtually any conceivable driving situation.

A disadvantage with the systems and methods mentioned above is, however, their complexity. They require hardware and software which is complex and potentially susceptible to faults. The expenditure on development and application in a vehicle is extremely high. In addition, if it is taken into account that such systems and methods are generally provided as all-wheel modules for vehicles with all-wheel drive which can be activated and deactivated and the actual portion of driving carried out in the all-wheel drive mode during the service life of a vehicle is typically very small, the expenditure on the development and application of such a system and a method by the manufacturers is often considered to be too high and too costly. This applies, in particular, to manufacturers and vehicles below the premium segment and to manufacturers of types of vehicle which, owing to their intended purpose, do not have a particular need for such complex systems, such as for example can be the case with off-road vehicles.

SUMMARY

Disclosed herein is a system for actuating a differential-free, clutch-controlled balancing unit of a motor vehicle, in particular of a passenger vehicle, in particular a lateral balancing unit and the method for controlling such a balancing unit. Also disclosed is a computer program product which causes an electronic control unit for controlling such a balancing unit to actuate the balancing unit according to the disclosed method.

Accordingly, disclosed herein are a system for operating a differential-free balancing unit of the type mentioned above, and a method for operating such a balancing unit, which are significantly reduced in their complexity compared to the known systems and methods and nevertheless constitute a satisfactory driving concept in all significant respects. In particular, a drive concept with an all-wheel drive which can be activated is aimed at. The present systems and methods achieve reduced expenditures over prior systems and methods, and moreover can be attractive to vehicle manufacturers of vehicles below the premium segment.

The system for operating a balancing unit is configured in such a way that the first clutch and the second clutch are always actuated in each case with the same value of the same variable manipulated parameter independently of the driving state. In terms of the method for operating a balancing unit it is also possible that the first clutch and the second clutch are always actuated in each case with the same value of the same variable manipulated parameter independently of the driving state.

The fact that the first clutch and the second clutch are set selectively independently of the driving state by changing a manipulated parameter during the operation of the vehicle in order to be able to transmit a specific torque or coupling torque means that the manipulated parameter which is responsible for the transmissible coupling torque can be varied in such a way that the coupling torque which can be transmitted by the clutches can both be set in such a way that no slip occurs (the clutches are closed with full engagement, and the maximum provided coupling torque can be transmitted) and can also be set in such a way that slip occurs infinitely (the clutches are opened and no appreciable coupling torque is transmitted) and that it can also be set selectively in such a way that the coupling slip which is present between the two limiting states mentioned above occurs at at least one clutch (the clutches are not closed with full engagement force but not fully opened either, in order to generate selectively a specific coupling torque, or selectively permit a limited slip, at at least one of the two clutches).

The system described above and the method described above simplify considerably the systems which are known from the prior art. On the one hand, control elements such as pressure control valves and the like can additionally be dispensed with. The control software to be developed no longer has to be able to ensure the actuation of separate control elements either, and a large part of the measuring technology which previously had to be used is dispensed with. For the same reason, the application of such a system of the vehicle also becomes significantly more simple because torque distributions in which the two clutches, and therefore the two driven wheels of an axle, are actuated differently, no longer have to be taken into account for the various driving states.

In order to activate the first clutch and to activate the second clutch, preferably in each case a separate clutch actuator is provided on which the manipulated parameters acts in order to activate the clutches. The setting of the value of the manipulated parameter which acts on the two clutches is preferably carried out here by means of a single manipulated parameter unit. The manipulated parameter unit is the unit which makes available the manipulated parameter for the actuation of the clutch actuators. This can accordingly be, in particular, a hydraulic pump which makes available hydraulic pressure as a manipulated parameter. However, it is also possible, depending on the clutch activation mechanism which is actually used, for these to be different manipulated parameter units which make available, for example, current, mechanical force, magnetic force or pneumatic pressure.

There is preferably provision that the manipulated parameter is pressure, that the system comprises a rotational-speed-regulated hydraulic pump, and that the change in the manipulated parameter is carried out by changing the rotational speed of the hydraulic pump. This configuration permits the manipulated parameter to be generated and changed centrally. This pressure can also be largely "transmitted" without loss and, in particular, uniformly; it is ensured that the manipulated parameter is always identical at both clutches, that is to say the same pressure is always present at each of the two clutches, continuously and independently of the driving situation.

The above statements clarify that the system is a system without individual actuator elements by which the manipulated parameter for the first clutch could be made available with a first value, and the manipulated parameter for the second clutch could be made available with a second value which is different from the first value on a clutch-specific basis if individual actuator elements were actually provided. In particular, it is this intentional elimination of individual actuator elements, in particular the elimination of hydraulic pressure control valves that are to be provided separately for each clutch, and therefore the elimination of the necessary separate and individual means of actuating such actuating elements, that permits significant simplification to be achieved compared to the prior art.

When a hydraulic pump is used as a manipulated parameter unit, the pressure which is generated by the hydraulic pump is therefore passed on both to the first clutch and to the second clutch without the intermediate connection of further pressure control valves which are connected downstream of the hydraulic pump.

Nevertheless, it is necessary to avoid the drive train tensioning during cornering, which requires balancing the rotational speed between the driven wheel on the inside of the bend and the driven wheel on the outside of the bend. The system or the method can also be used to assist the driver in a selective fashion in critical driving situations or to avoid critical driving situations in a selective fashion. In order to ensure this, the data such as wheel rotational speeds or steering lock or other relevant driving state data which is usually present in the CAN (Controller Area Network) bus of the vehicle is input and included in the calculation of the clutch actuation force which is necessarily in the respective driving state.

There can be provision that the calculation of the manipulated parameter is based on the force flux potential of the driven wheel on the inside and during cornering. This leads to a situation in which the clutch which drives the driven wheel on the outside of the bend permits slip in order to avoid tensioning of the drive train.

In an expanded configuration there can be provision that the calculation of the manipulated parameter during cornering is based on the force flux potential of the wheel on the inside of the bend only for as long as the specific lateral acceleration threshold value is not exceeded. Above the lateral acceleration threshold value, the force flux potential of the wheel on the outside of the bend is used as the basis for the calculation of the manipulated parameter during cornering. This increases the traction and permits higher cornering speeds.

In the case of acceleration from a stationary state, a system for detecting different force flux potentials of the driven wheels can be used (μ-split detection) in which the calculation of the manipulated parameter is oriented decisively toward the force flux potential of the driven wheel with the high force flux potential (μ-high closed-loop control). The balancing unit would act as limited slip differential here.

In order to avoid critical driving situations which can arise when the driven wheel of a rear axle which has the higher flux force potential to the proportion contributes excessively to, and therefore forces the vehicle to rotate about, the vertical axis, as the speed of the vehicle increases μ-low closed-loop control can be superimposed on μ-high closed-loop control during the calculation of the manipulated parameter, during which calculation the force flux potential of the driven wheel with the lower force flux potential is decisive for the calculation of the manipulated parameter. As a result, the driving stability at relatively high speeds is improved. A μ-low closed-loop control for, in particular, relative high vehicle speeds (for example higher than 50 km/h) can, of course, also be provided without the presence of a μ-high closed loop control provided for starting or for low vehicle speeds.

The balancing unit per se and a drive train with such a balancing unit which each have a system for operating the balancing unit as explained above and below are also part of the present disclosure. An electronic control unit (ECU) in the program memory of which a computer program product which is configured to carry out the method explained above and below is also part of the disclosure.

SUMMARY OF THE DRAWINGS

Further features and advantages of the invention emerge from the dependent claims and from the following description of preferred exemplary embodiments on the basis of the drawings, in which:

DESCRIPTION

Figure 1:
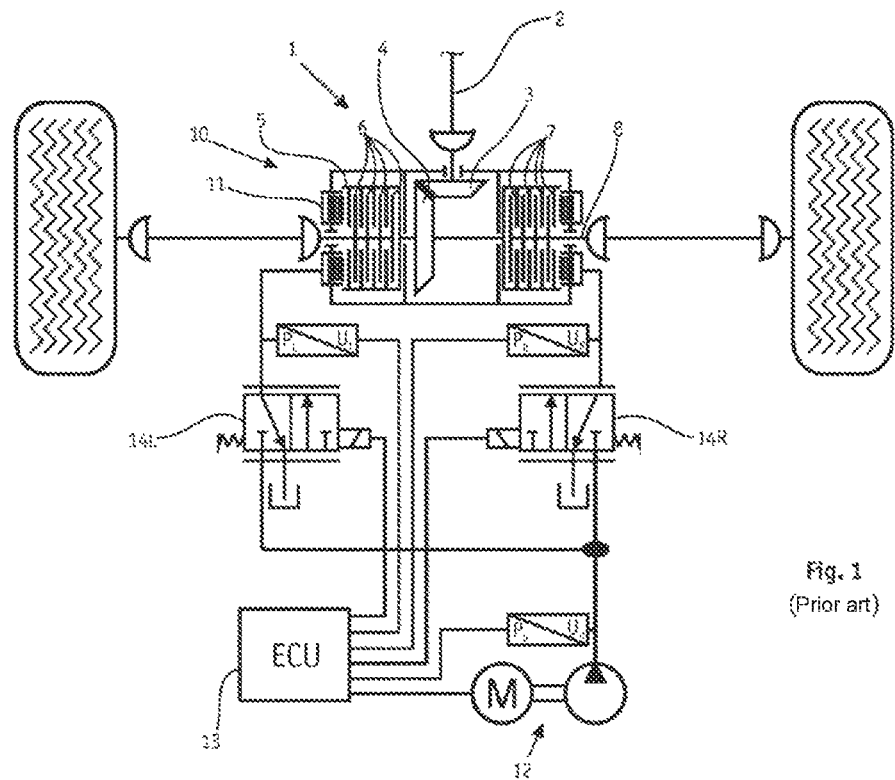
FIG. 1 shows a clutch-controlled, differential-free balancing unit having a control device known from the prior art in a schematic illustration.

FIG. 1 shows a balancing unit 1, known from the prior art, together with the system for the operation thereof in a schematic view. The symmetrical basic design of the balancing unit which is described below, with the two coupling units 10, applies in the same way to the design shown in FIG. 2. The letters "L" and "R" which are assigned to a specific reference symbol indicated in the figures stand for the respective left-hand ("L") or right-hand ("R") component of the symmetrical basic design.

The drive power of the vehicle drive is typically transmitted to a crown gear 4 via an input element 2, typically a Cardan shaft, and a driven wheel 3 connected thereto, and is transmitted from there to a left-hand or right-hand drive multi-disk carrier 5, to which in each case drive multi-disks 6, which are each arranged in an axially displaceable fashion, are assigned in a rotationally fixed fashion. These drive disks interact with left-hand or right-hand drive disks 7 which in turn interact with the left-hand or right-hand output element 8 in a rotationally fixed fashion and are arranged in an axially displaceable but rotationally fixed fashion on the left-hand or right-hand output multi-disk carrier 9. The left-hand or right-hand coupling unit 10 which is formed in this way constitutes a basically known multi-disk clutch.

Both the right-hand clutch unit and the left-hand clutch unit are each assigned a clutch actuator 11, which is preferably to be activated hydraulically, wherein as an alternative to a hydraulic clutch activation it is also possible appropriately to use other clutch activation mechanisms, in particular electromechanical, electromagnetic, electro hydraulic or pneumatic clutch activation mechanisms. Owing to this clutch actuator, the clutch units are actuated and by means of the "hydraulic pressure" manipulated parameter the clutch pressure, that is to say the contact pressure force with which the output or drive disks are influenced for each of the clutches, and consequently the torque which can be transmitted by the clutches, can be adjusted selectively. In the case of clutch activation mechanisms which operate by means of hydraulic pressure, the manipulated parameter would, depending on the mechanism selected, be, for example, a mechanical force, current strength, electrical voltage or a pneumatic pressure.

In the figures, the drive multi-disk carrier 5 which is coupled in a rotationally fixed fashion to the input element 2 is embodied as an external multi-disk carrier, and the output multi-disk carrier which is coupled in a rotationally fixed fashion to the driven wheels is embodied as an internal multi-disk carrier. This configuration can, of course, also be reversed.

FIG. 1 shows a system for operating and actuating the left-hand and right-hand clutch units in which the left-hand and right-hand clutch of the two clutches 10 can be actuated individually with a different pressure $p_L$ or $p_R$ independently of the driving state. In order to actuate the left-hand and right-hand clutches it is therefore possible, depending on the driving situation, to use the "hydraulic pressure" manipulated parameter in each case with a different value. This has the advantage that the output pressure $p_O$, which is generated by a hydraulic, motor-operated pump unit 12, can act in an optimum way on the two clutches in accordance with the driving state, in order to assign to the left-hand or right-hand driven wheel precisely the driving torque or the driving power which is considered to be optimum for the respective driving state and the desired driving behavior. It is therefore possible to influence the traction or the vehicle movement dynamics selectively in various driving situations.

As is apparent in FIG. 1, the system is complex. An electronic control unit 13 senses the pressures $p_O$, $p_L$, and $p_R$ present in the system and actuates the left-hand or right-hand clutch individually by means of two control valves 14 acting independently of one another, on the basis of stored characteristic diagrams and taking into account driving state data (wheel speeds, acceleration forces, inclination of the vehicle, speed, steering angle etc). The development of the control algorithms which are necessary for this and the application of such a system in the vehicle in a manner that is ready for mass production is costly, tedious, and expensive. The multiplicity of components to be used for control and the sensor system poses an increased potential for faults and component failures. For such cases, it is also necessary to implement fallback options which reliably rule out the undesired production of driving states which are no longer safe.

Figure 2:
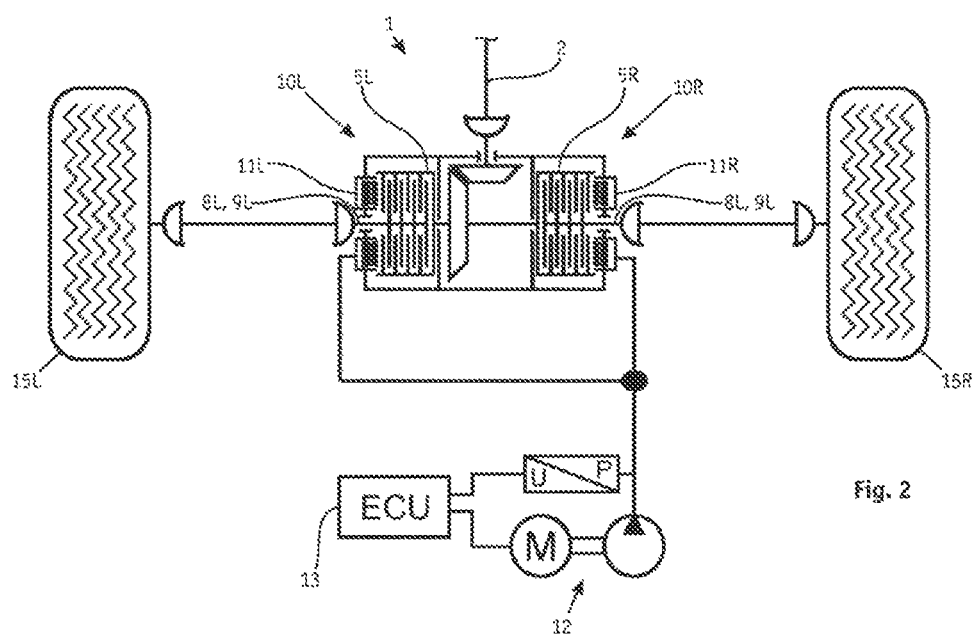
FIG. 2 shows an example simplified balancing unit that has a control device.

FIG. 2 shows an alternative system to this for operating the clutch units 10 which are otherwise unchanged compared to FIG. 1. FIG. 2 already clarifies that the present system constitutes a substantial simplification. In this context, not only are the individually different actuations of the left-hand and right-hand clutch dispensed with, but overall the use of control elements such as control valves and of a sensor system are dispensed with.

The manipulated parameter which can be generated differently by this system is always transmitted with the same value both to the left-hand clutch and to the right-hand clutch independently of the driving state, that is to say independently of the respective driving situation. Therefore, although the coupling torque which can be transmitted by the two clutches is variable, it is always the same for both clutches. Although this restricts the possibilities provided by a configuration according to FIG. 1, it gives rise to a considerably simpler, more cost-effective and easier to apply design which always still provides a satisfactory driving behavior and sufficient possibilities for influencing the traction and driving behavior. If it is additionally taken into account that the proportion of driving in which an all-wheel drive vehicle is actually operated in the all-wheel mode over its service life is extremely small, the present system and method provides the possibility of also equipping the vehicles with an all-wheel drive which can be activated, and in which vehicles the use of a system as is illustrated schematically in FIG. 1 is otherwise felt to be too costly.

In the system according to FIG. 2, which is simplified compared to the system according to FIG. 1, there is in particular provision that the "supply" of the first and second clutches with the manipulated parameter which influences the contact pressure of the clutch disks takes place without further control elements such as control valves and therefore in a "control-valve-free" free fashion in the case of the use of a hydraulic pump, that is to say in particular without individual control elements connected downstream of the hydraulic pump. The value of the "hydraulic pressure" manipulated parameter is regulated by means of the pumping power of the hydraulic pump unit in the case shown in FIG. 2, in particular, by means of the delivery capacity thereof, which varies with the rotational speed. In the case of other types of clutch activation mechanisms, this statement applies, of course, equally to the manipulated parameter which is to be influenced then.

Figure 3:
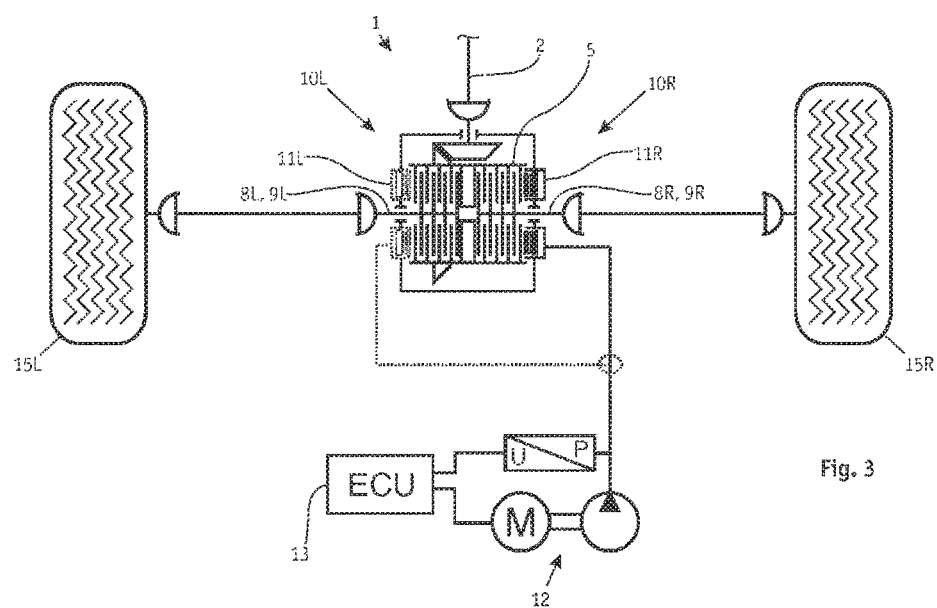
FIG. 3 shows an alternative example balancing unit to the balancing unit provided with a single drive multi-disk carrier for both output elements.

FIG. 3 shows an alternative configuration as the balancing unit shown in FIG. 2. Here, the two output elements 8 and drive multi-disk carriers 9 divide a common drive multi-disk carrier 5, which makes a very compact design possible.

The dashed line leading to the left-hand clutch actuator 11L and the dashed illustration of the left-hand clutch actuator itself are intended to clarify the fact that said clutch actuator can be provided optionally. This is for a case in which both sides of the clutch of the balancing unit share a drive multi-disk carrier 5, but a clutch actuator 11R has to be provided only on one side. On the side facing away from the clutch actuator only an axial support with which the actual coupling forces for support has to be provided.

However, it can be disadvantageous with such a configuration that when the number of disks increases the coupling forces do not act sufficiently on the side of the clutch unit facing away from the clutch actuator because when the individual disks shift under load high axial frictional forces occur at the toothing arrangements which counteract the axial shifting of the clutch disks. If necessary, it is therefore also optionally possible to have recourse to a second clutch actuator, as also in FIG. 2.

The invention claimed is:

1. A system comprising a differential-free balancing unit of an at least temporarily drivable axle of a motor vehicle, the balancing unit comprising:
   an input element;
   a first output element couplable to the input element via a first frictionally locking clutch to transmit drive power to a first driven wheel; and
   a second output element couplable to the input element via a second frictionally locking clutch to transmit drive power to a second driven wheel;
   wherein the coupling torques which can be set for the first clutch and the second clutch are set selectively as a function of a driving state by a control device by calculation of a manipulated parameter during the operation of the vehicle, wherein the first clutch and the second clutch are actuated with a same value of the manipulated parameter independently of the driving state, and wherein the calculation of the manipulated parameter is based on a force flux potential of one of the first or second driven wheel on the inside of a bend during cornering.

2. The system of claim 1, wherein the calculation of the manipulated parameter is based on the force flux potential of a wheel on the inside of a bend when cornering below a lateral acceleration threshold value, and the calculation of the manipulated parameter is based on the force flux potential of a wheel on the outside of the bend when cornering above the lateral acceleration threshold value.

3. The system of claim 1, further comprising a clutch actuator to activate the first clutch and to activate the second clutch, wherein the manipulated parameter acts on activation of the clutches is determined by a one and only one manipulated parameter unit.

4. The system of claim 3, wherein the manipulated parameter is pressure, and a change in the manipulated parameter is carried out by changing the rotational speed of a hydraulic pump.

5. The system of claim 3, wherein the manipulated parameter acts both on the first clutch and on the second clutch without intermediate connection of further individual control elements via which the manipulated parameter for the first clutch is set to a first value, and the manipulated parameter for the second clutch is set to a second value which is different from the first value.

6. The system of claim 1, further comprising an electronic control unit to actuate the balancing unit including calculating the manipulated parameter.

7. A system comprising a differential-free balancing unit of an at least temporarily drivable axle of a motor vehicle, the balancing unit comprising:
an input element;
a first output element couplable to the input element via a first frictionally locking clutch to transmit drive power to a first driven wheel; and
a second output element couplable to the input element via a second frictionally locking clutch to transmit drive power to a second driven wheel;
wherein the coupling torques which can be set for the first clutch and the second clutch are set selectively as a function of a driving state by a control device by calculation of a manipulated parameter during the operation of the vehicle, wherein the first clutch and the second clutch are actuated with a same value of the manipulated parameter independently of the driving state, and
wherein detection of first and second force flux potentials of the respective first and second driven wheels is provided, and during the calculation of the manipulated parameter in the case of acceleration from a stationary state the force flux potential of a driven wheel with a higher force flux potential is used for the calculation of the manipulated parameter.

8. The system of claim 7, wherein the calculation of the manipulated parameter is based on the force flux potential of a wheel on the inside of a bend when cornering below a lateral acceleration threshold value, and the calculation of the manipulated parameter is based on the force flux potential of a wheel on the outside of the bend when cornering above the lateral acceleration threshold value.

9. The system of claim 7, further comprising a clutch actuator to activate the first clutch and to activate the second clutch, wherein the manipulated parameter acts on activation of the clutches is determined by a one and only one manipulated parameter unit.

10. The system of claim 8, wherein the manipulated parameter is pressure, and a change in the manipulated parameter is carried out by changing the rotational speed of a hydraulic pump.

11. The system of claim 8, wherein the manipulated parameter acts both on the first clutch and on the second clutch without intermediate connection of further individual control elements via which the manipulated parameter for the first clutch is set to a first value, and the manipulated parameter for the second clutch is set to a second value which is different from the first value.

12. The system of claim 7, further comprising an electronic control unit to actuate the balancing unit including calculating the manipulated parameter.

13. A system comprising a differential-free balancing unit of an at least temporarily drivable axle of a motor vehicle, the balancing unit comprising:
an input element;
a first output element couplable to the input element via a first frictionally locking clutch to transmit drive power to a first driven wheel; and
a second output element couplable to the input element via a second frictionally locking clutch to transmit drive power to a second driven wheel;
wherein the coupling torques which can be set for the first clutch and the second clutch are set selectively as a function of a driving state by a control device by calculation of a manipulated parameter during the operation of the vehicle, wherein the first clutch and the second clutch are actuated with a same value of the manipulated parameter independently of the driving state, and
wherein during the calculation of the manipulated variable at a high vehicle speed a µ-low control is provided in which a force flux potential of a driven wheel with lower force flux potential is used for the calculation of the manipulated parameter.

14. The system of claim 13, wherein the calculation of the manipulated parameter is based on the force flux potential of a wheel on the inside of a bend when cornering below a lateral acceleration threshold value, and the calculation of the manipulated parameter is based on the force flux potential of a wheel on the outside of the bend when cornering above the lateral acceleration threshold value.

15. The system of claim 13, further comprising a clutch actuator to activate the first clutch and to activate the second clutch, wherein the manipulated parameter acts on activation of the clutches is determined by a one and only one manipulated parameter unit.

16. The system of claim 15, wherein the manipulated parameter is pressure, and a change in the manipulated parameter is carried out by changing the rotational speed of a hydraulic pump.

17. The system of claim 15, wherein the manipulated parameter acts both on the first clutch and on the second clutch without intermediate connection of further individual control elements via which the manipulated parameter for the first clutch is set to a first value, and the manipulated parameter for the second clutch is set to a second value which is different from the first value.

18. The system of claim 13, further comprising an electronic control unit to actuate the balancing unit including calculating the manipulated parameter.

* * * * *